Feb. 21, 1967 KATSUYA ATSUMI 3,305,187

PUSH BUTTON TAPE DRIVE CONTROL ARRANGEMENT

Filed Dec. 19, 1963 3 Sheets-Sheet 1

INVENTOR.
KATSUYA ATSUMI
BY Eyre, Mann & Lucas

INVENTOR.
KATSUYA ATSUMI
BY Eyre, Mann & Lucas

PUSH BUTTON TAPE DRIVE CONTROL ARRANGEMENT

Filed Dec. 19, 1963

INVENTOR.
KATSUYA ATSUMI
BY Eyre, Mann, & Lucas

United States Patent Office 3,305,187
Patented Feb. 21, 1967

3,305,187

PUSH BUTTON TAPE DRIVE CONTROL ARRANGEMENT

Katsuya Atsumi, Kohjiya-cho, Ohta-ku, Tokyo, Japan, assignor to Akai Electric Company, Limited, Tokyo, Japan Filed Dec. 19, 1963, Ser. No. 331,653
7 Claims. (Cl. 242—55.12)

This invention relates generally to tape drive control mechanisms of magnetic tape recording and playback machines, hereinafter briefly referred to as tape recorders, and more specifically to push button arrangements incorporated in these machines for the control of the tape drive.

According to a conventional technique, a series of tape drive control push buttons for control of fast forward winding, playing or starting, stopping, recording and fast reverse winding operations is arranged successively in the abovementioned order and in a straight line.

In this type of tape recorder, it is necessary to provide a safety means preferably in the form of a separate push button which serves for positively preventing a careless and unintentional actuation of the recording button and thus avoids unintentional erasure of valuable recorded informations on the magnetic tape which will be referred to hereinafter briefly as "the tape."

It is the main object of this invention to provide a unique five button tape drive control arrangement wherein the aforementioned additional safety button is completely dispensed with and wherein the safety function thereof has been incorporated into the function a playing push button.

It is an object of the invention to provide a tape drive control arrangement of the above nature which can effectively fulfil the necessary complicated interlocking operations for carrying out the above dual-function of the playing button.

A further object of the invention is to provide a control arrangement of the nature above referred to which provides for converting the fast forward tape drive into the fast reverse drive and vice versa without intermediate actuation of the stop control push button, and for bringing the power transmission to the tape reeling mechanism into its neutral position when the fast forward and fast reverse winding push buttons are erroneously depressed simultaneously.

These and other objects and features of the invention will be better understood from the following detailed description when read with reference to the accompanying drawings in which.

Figure 10:
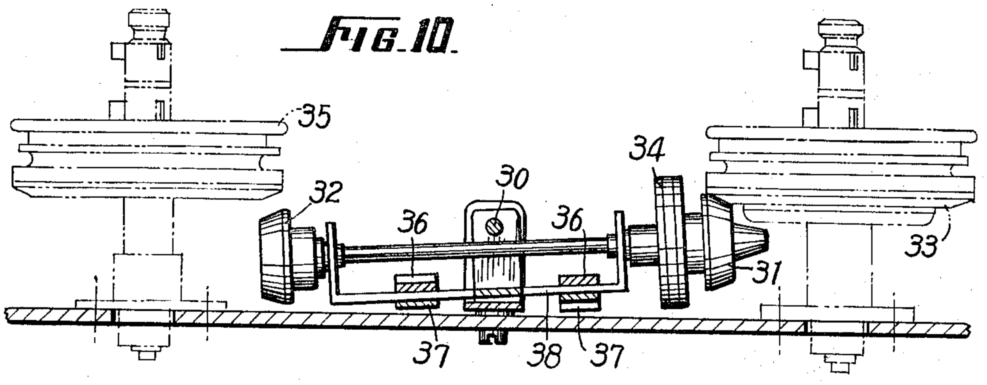
Figure 11:
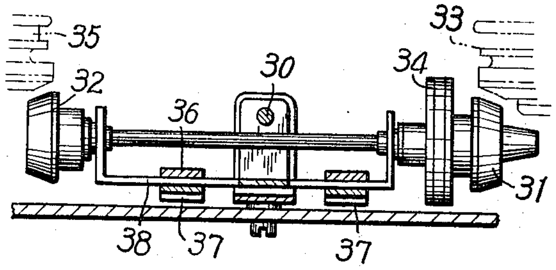
Figure 12:
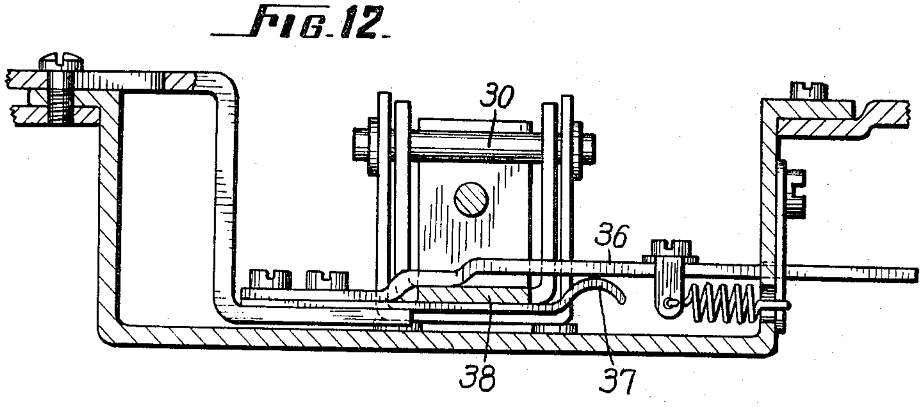

FIGS. 10 and 11 are an operating and neutral position of a power transmission to the tape reeling mechanism of a tape recorder which transmission is arranged to be push-button-controlled according to the novel teaching of the invention, several parts of the said transmission being shown in section; and FIG. 12 is a sectional view of a control motion transmitting mechanism placed between several of the five control buttons and the power transmission shown in FIGS. 10 and 11.

The invention provides a unique combination in a tape drive control button arrangement of a tape recorder wherein a fast forward winding button, a playing button, a stop button, a recording button and a fast reverse winding button are arranged in a row and pivotally mounted to be separately manipulatable on a chassis panel of said recorder, comprising: an elongated locking plate common to all of said five buttons except said stop button and slidably mounted on said panel; and a spring tensioned between said plate and said panel for urging said plate towards one of two locking positions it may assume, said plate being formed with four projections for cooperation with slots formed in slides linked with said four buttons, two of said slots formed in the slides of said fast forward and reverse winding buttons having a same first configuration and the remaining two slots formed in the slides of said playing and recording buttons having a same second configuration so that each of said two button groups may be actuated upon separately and simultaneously as desired.

In the novel arrangement according to the invention, there is further provided an elongated pivotable and spring-loaded stopper which extends substantially over the whole length of the button series and is provided with a tongue formed substantially at the central area of the stopper for cooperation only with said stop button for the purpose of resetting other buttons from their operating to non-operating position simultaneously, when occasion desires it.

Figures 1, 2, 3:
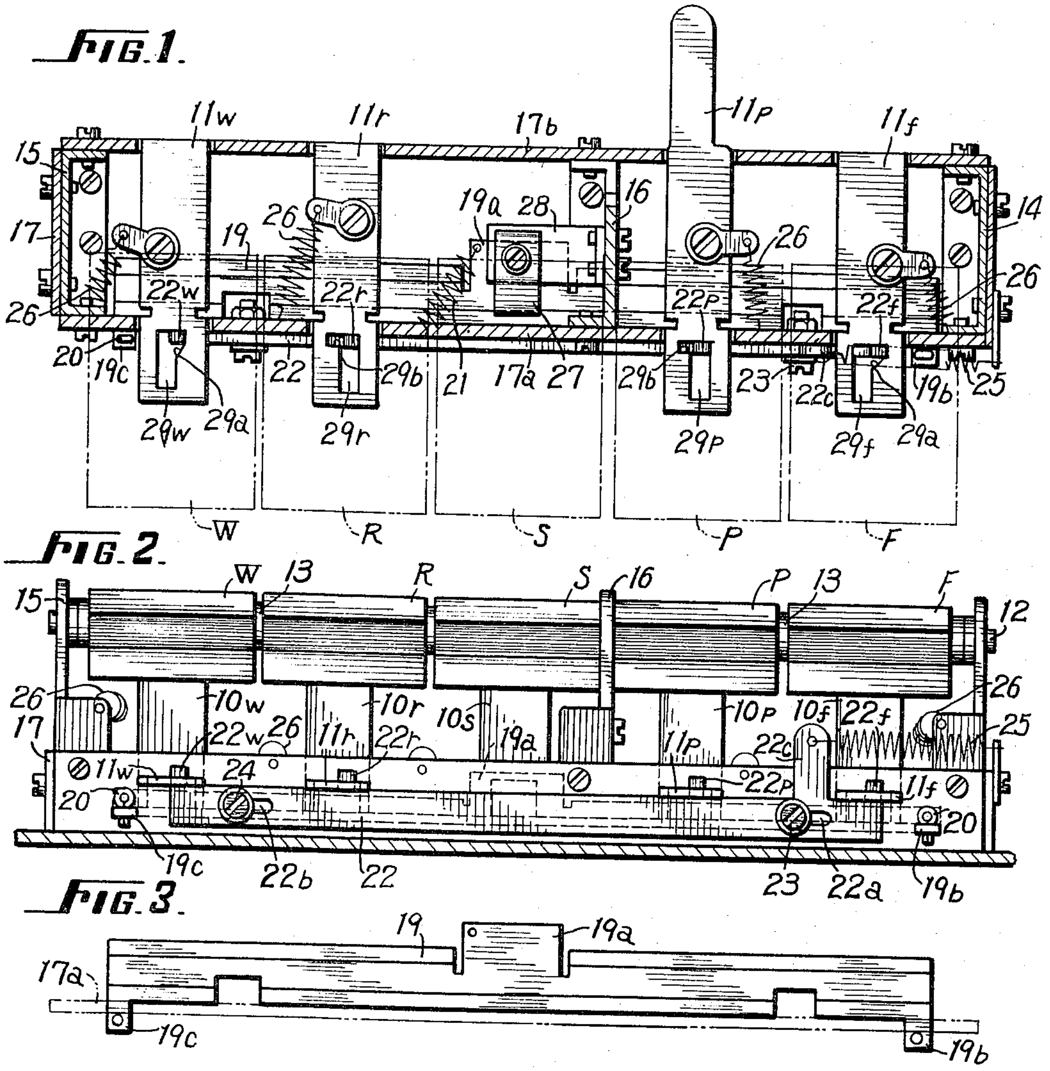
FIG. 1 is a horizontal longitudinal section of a support frame rigidly mounted on the upper panel of a chassis of a tape recorder for mounting five tape drive control buttons as well as their related parts, the buttons being illustrated only schematically by chain-dotted line blocks in order to permit clear representation of related inner parts.
FIG. 2 is a front elevational view of the support frame shown in FIG. 1 with the five control buttons illustrated in full.
FIG. 3 is a top plan view of an elongated and pivotally arranged stopper bar common to all the five control push buttons except that for stop control.
Figure 4:
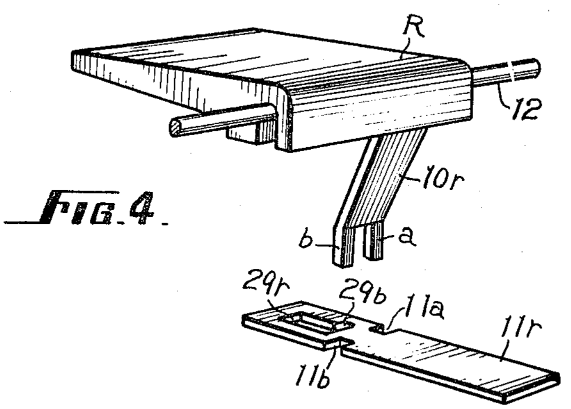
FIG. 4 is an exploded perspective view of the recording push button employed and its related slide.

Referring now to the drawings, especially FIGS. 1 and 2, F denotes a fast forward winding button; P a playing or starting button; S a stopping button; R a recording button; and W a fast reverse winding button. All these push buttons are arranged in a horizontal row as shown in FIGS. 1 in a simplified manner by chain-dotted lines so as to illustrate clearly their related inner parts. These buttons are shown by way of example in rectangular configuration in their top plan view, yet other shapes can of course be used. The buttons F, P, S, R and W are provided respectively with depending stems 10_f_, 10_p_, 10_s_, 10_r_ and 10_w_ attached at their upper ends fixedly therewith. The said stems, except that of stop button S, are provided each at their lower ends with forked projections _a_ and _b_ and linked with slides 11_f_, 11_p_, 11_r_ and 11_w_, respectively, which are formed each with a couple of side notches 11_a_ and 11_b_ so as to receive said forks loosely, as shown by an exploded perspective view of button R and slide 11_r_ shown in FIG. 4.

All buttons F, P, S, R and W are mounted on an elongated horizontal support bar 12 so as to be separately rotated thereabout when finger-operated as usual. A spacer ring 13 is provided between each two adjoining push buttons and mounted on the bar 12, as clearly seen from FIG. 2, so as to keep them in position. The bar 12 is rigidly supported at its both ends by stationary brackets 14 and 15 and at its intermediate point by a further bracket 16. These brackets constitute part of a support frame 17 which mounts other parts to be described hereinafter and is rigidly mounted in turn on a conventional chassis 18 of the machine, thus providing facilities for the block assemblying.

An elongated pivotable stopper 19 extends substantially over the whole length of the push button series and is formed at its central area with a tongue 19*a* which is adapted to cooperate with stop button S only. The stopper is further formed at its both ends with perforated projections 19*b* and 19*c*, respectively, which extend through correspondingly shaped openings in the front wall 17*a* of frame 17 and are secured by the split pins 20. The pivotable stopper 19 is urged by a spring 21 tensioned between it and frame 17 so as to normally occupy its upper position shown in FIGS. 7 and 8 by the full-lined cross-sections in both figures. The end view of the stopper is shown in FIG. 9.

An elongated lock plate 22 is slidably attached to the front surface of front wall 17*a* of the support frame 17 and is provided near its both ends with a pair of elongated slots 22*a* and 22*b* which slidably receive guide pins 23 and 24, respectively, studded to the wall 17*a*.

Lock plate 22 is formed with a lateral projection 22*c* to which one end of a tension spring 25 is attached and the opposite end of the said spring is fixed to the lateral wall of frame 17. Under the action of this spring, the lock plate is held in its normal position shown in FIGS. 2 and 6.

Each of the slides 11*f*, 11*p*, 11*r* and 11*w* is slidably mounted in correspondingly shaped slots formed in the front and rear walls 17*a* and 17*b* of frame 17 and kept in the position shown in FIG. 1 under the action of tension spring 26. Any further over-sliding movement of each of the slides is positively prevented by the aforementioned fork ends *a* and *b* which abut in this case against the upper edge of front wall 17*a*. With the slides kept in the position in FIG. 1, all the related push buttons are kept in their horizontal or off-service position.

Figure 8:
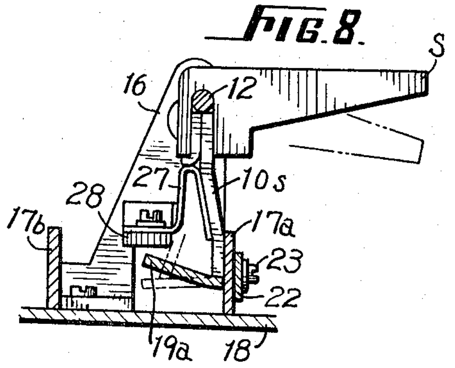
Figure 9:
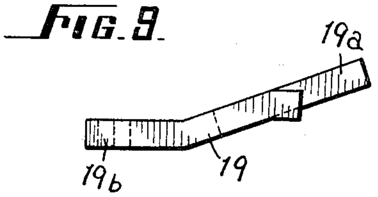
FIG. 9 is an end view of the stopper bar referred to above in the identification of FIG. 3.

As shown in FIG. 8, stop button S is normally kept in its horizontal position under the urging force of a U-spring 27 one end of which is attached to an angle 28 rigidly supported on bracket 16, the opposite end of the spring acting on the stem 10*s* of the stop button abutting against the rear surface of front wall 17*a* in this case.

Figure 5:
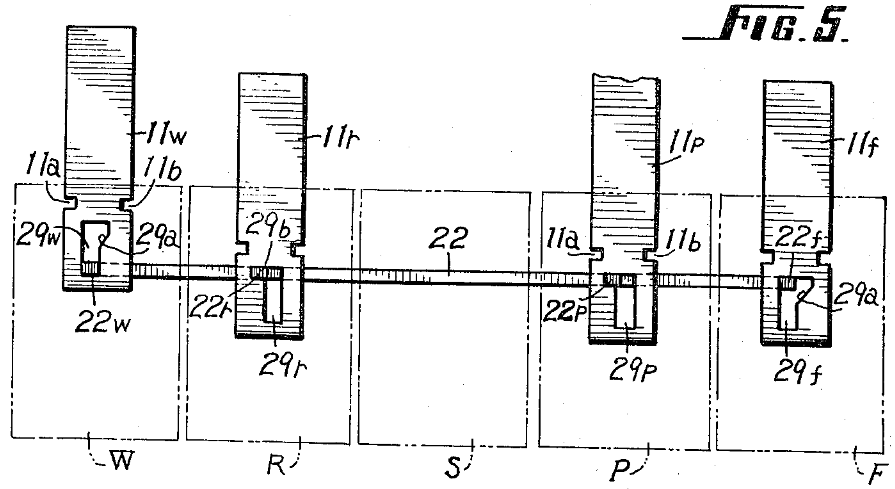
FIGS. 5 and 6 are two top plan views of four slides acted upon by associated push buttons.
Figure 6:
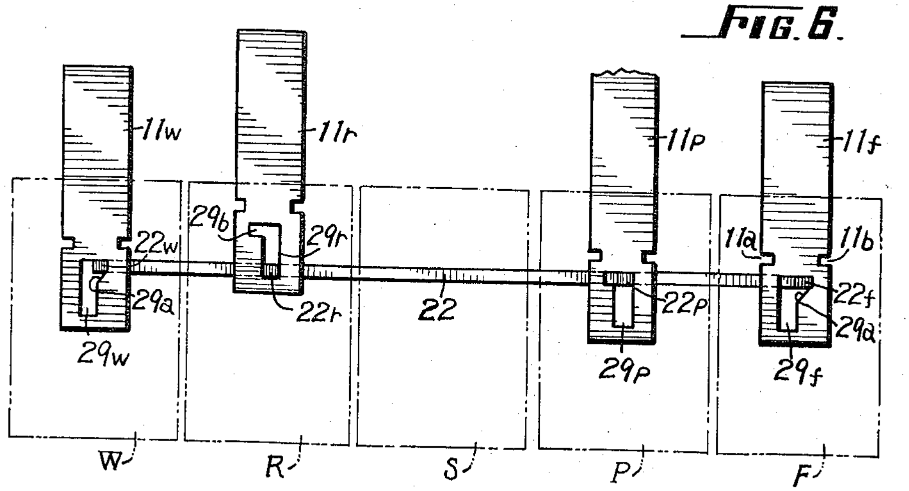

Slides 11*f* and 11*w* have the same configuration as seen from FIGS. 5 and 6 and are each provided with a substantially rectangular slot 29*f* or 29*w* which is enlarged at its one end by the provision of an inclined and enlarged edge portion or notch 29*a*. Vertical projections 22*f* and 22*w* formed on lock plate 22 project through the slots 29*f* and 29*r*, respectively. The inclined edge portion of notches 29*a* provide a camming action on the projections 22*f* and 22*w* which is utilized to shift the lock plate 22 from its normally locking position shown in FIGS. 1, 2 and 6 to a second locking position shown in FIG. 5, as will be more full explained hereinafter.

In a similar way, slides 11*p* and 11*r* have the same configuration. Each of these slides is formed with a slot 29*p* or 29*r*, respectively, which is enlarged at its end by the provision of a rectangular notch 29*b*. Projections 22*p* and 22*r* formed on lock plate 22 project through these slots 29*p* and 29*r*, respectively.

Figure 7:
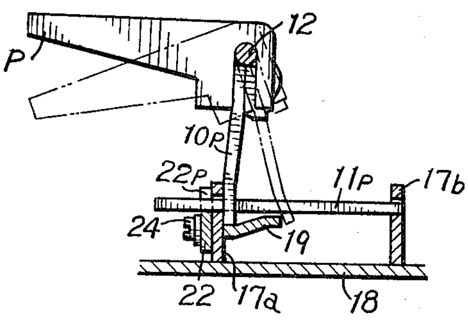
FIGS. 7 and 8 are side views of the fast forward control button and the stop control button, respectively, wherein several related parts are shown in section.

When the playing button P is depressed, it rotates about bar 12 in the counter-clockwise-direction in FIG. 7 towards its operating position shown by a chain-dotted line and the stem 10*p* acts upon stopper 19 to pivot the same slightly in the clockwise direction until the lower edge of the stem 10*p* clears the outer pivoting edge of the stopper 19 at which time the stopper 19 makes a return pivoting movement behind the stem. Thus the stem 10*p* is brought into pressure engagement with the free end edge of the stopper 19 as shown by chain-dotted lines in the same figure, and the button becomes positively locked in its operating position. The urging force provided by spring 21 assists effectively the above-mentioned locking action.

During the depressing operation, the fork ends *a* and *b* of stem 10*p* cause the slide 11*p* to move forwards (which means upwards in FIG. 1) so that the projection 22*p* on plate 22 is kept in engagement with the slot proper 29*p*, the width of the latter being selected to be substantially equal to that of the projection. Thus, the lock plate 22 is positively prevented from shifting in the longitudinal direction thereof.

This means that the fast forward winding button F cannot be actuated to on-service position because at this time the notch 29*b* is out of alignment with the projection 22*p* by reason of the playing button P having been manipulated to its on-service position. Thus the projection 22*f* is not free to move towards the left in FIG. 1 as said projection must move in order to allow the fast forward winding button F to be actuated to its on-service position. It will be thus clear that when playing button P is kept in its on-service position, fast forward winding button F is positively locked in its off-service position.

This will apply also to the fast reverse button W on account of its similar design to button F. It is therefore evident that both fast winding buttons F and W are effectively locked while playing button P is depressed and kept in its depressed position.

It is to be noted that because the slot configuration 29*r* of the slide 11*r* of the recording button R is the same as the playing button P, the recording button R may be actuated subsequently to or simultaneously with the playing button P and furthermore the recording button R may be first actuated in place of the playing button P to achieve the locking effect described above against activation of the fast forward and fast reverse winding buttons F and W respectively.

When the fast forward winding button F only is depressed with the remaining four buttons kept in their off-service position as illustrated in FIGS. 1 and 2, the fork ends of the stem of this button act in the similar way as before upon the stopper 19 to pivot the same and come into locking engagement with the front edge of the latter, whereby the button F is positively locked in its depressed or operating position.

During actuation of the fast forward winding button F, the inclined cam surface 29*a* of slot 29*f* cams against projection 22*f* with the advancing movement of slide 11*f* caused by the depression of button F to move said projections to the left of the position shown in FIGS. 1, 2 and 6, whereby the lock plate 22 is also caused to shift in the same direction. By this operation, the corresponding projection 22*p* allotted to push button P enters the notch 29*b*, whereby slide 11*p* and the button P are locked positively in off-service position. In a similar way, projection 22*r* enters the notch 29*b* of slot 29*r*, whereby slide 11*r* and its related push button R are locked in off-service position. It will be clear from the foregoing that should an attempt be made to depress either button P or R, such a manipulation is positively prevented from taking place. Thus, it is evident that while a fast forward tape drive is being carried out, a playback- or recording-operation cannot take place through accident or inadvertence.

It is to be noted that because the slot 29*w* of the slide 22*w* of the fast reverse winding button W has the same configuration as that of the fast forward winding button F, the same locking effect noted above can be achieved by first manipulating the fast reverse winding button W instead of the fast forward winding button F. Also the fast forward and fast reverse winding buttons F and W can be actuated successively or simultaneously but neither of the playing and recording buttons can be actuated after one of the fast forward and fast reverse winding buttons F and W is manipulated to on-service position. One important advantage of the foregoing arrangement is that the fast forward tape drive can be converted into the fast reverse tape drive at will without manipulating the stop button S. Since the design and arrangement of button W is completely similar to that of button F, a fast forward winding tape drive can be effected also directly from a preceding fast reverse winding operation without an intermediate stop operation by the manipulation of stop button S.

These operational advantages are achieved because of the fact that when button W is depressed after button F has been depressed, the stopper 19 held in its upper position is caused by the actuation of button W to rotate slightly in the clockwise direction in FIG. 7, thus releasing the locked condition of button F and letting it to return to its off-service position under the urging action of the corresponding one of tension springs 26 and only thereafter does button W act upon the stopper to rotate it in the clockwise direction in FIG. 7 so as to lock the button W in its operating position by the engagement of its front edge with stem 10*w*.

The same automatic switching effect is achieved in an analagous manner if the button W is first depressed followed by depression of button F whereby a fast reverse winding operation is changed to a fast forward winding operation without using the stop button S.

Likewise when recording button R is depressed after the initial depression of playing button P, it will be clear from the foregoing that button P in this case is first caused to return to its off-service position and only then the recording button R is locked in its operating position.

The same is true of the converse sequence where button R is first depressed followed by depression of button P, so that automatic switching is achieved between playing and recording operations without manipulation of the stop button S.

When stop button S is depressed while at least any one of the remaining four buttons F, P, R and W is locked in its operating position by the stopper 19 as previously described, the lower end of the stem 10*s* will press upon the tongue 19*a* of stopper 19 which is thereby caused to pivot slightly in the counter-clockwise direction in FIG. 8 (or in the clockwise direction in FIG. 7) and the button locked previously in its depressed or operating position is automatically released and thus returned to its normal rest position under the action of spring 26. The size and dimensions of the tongue 19*a* are so selected that the tip of the stem 10*s* cannot clear the free outer edge of the tongue 19*a* so that the stopper button S cannot be locked in an on-service position in the manner previously described for locking of the remaining buttons F, P, R and W. Thus, when the operator releases his finger from the depressed button S, it will automatically return to its normal position under the influence of spring action as at 27.

When button F is depressed, motion is transmitted through a transmission mechanism shown in FIG. 12 and in the way to be described hereinafter with reference to that figure, to a pivotably arranged power transmission assembly which is thereby caused to swivel about a pivot 30 so as to bring one of its friction drive wheels 31 into driving contact with a take-up reel assembly 33. Motion is thus transmitted from an electric motor (not shown) through a belt 34 and a wheel 31 to the take-up assembly.

On the other hand, when button W is depressed, the assembly is swiveled in the opposite direction about pivot 30 so that a friction drive wheel 32 of that assembly is brought into driving engagement with a tape supply reel assembly 35, which is thus caused to rotate, instead of the take-up assembly 33, and in the reverse direction to that of the latter assembly.

It will be noted from the foregoing that when the both fast winding buttons F and W are simultaneously depressed from failure or some other cause, or when both said buttons are in off-service positions, the power transmission assembly may be kept at its balanced neutral condition, thus no power being transmitted to either reel assembly 33 or 35 and any break or the similar damage of the tape being effectively avoided.

FIG. 12 represents the transmission mechanism by which motion is transmitted from either depressed fast winding button F or W to the pivotable power transmission, wherein the mechanism is illustrated in its normal or neutral position. When either button is depressed, rod 36 which is linked to the slide 11*f* or 11*w*, as the case may be, although the connection is not shown for simplicity, is shifted to the left as shown in FIG. 12 whereby the upwardly curving portion of strip spring 37 is pushed below the bottom surface of the U-shaped bracket 38 which is pivotable about the pivot rod and axis 30. The spring exerts an upward force upon the bracket 38 which thereby is urged to move upwardly into the clearance between the top surface of the bracket 38 and the overlying rod 36 which clearance is illustrated in FIG. 12. As a result the bracket 38 swivels and causes one or the other of the friction drive wheels 31 and 32 to engage the adjacent tape take-up reel 33 or tape supply reel 35. Since the control rod 36 and strip spring 37 assembly is the same on both sides of the pivot axis, the manner in which the wheel 31 or the wheel 32 is pivoted up into engagement with the adjacent reel is the same in both cases.

Similar connecting or transmission mechanisms are provided for the other push buttons except stop button S for providing similar control action upon the power transmission, although for simplicity and to avoid repetition these are not shown in the drawings. Similarly, brake mechanisms and actuating means connected between said buttons and the brakes have been omitted because they are conventional and well known and do not constitute any part of the present invention. It should be noted briefly that the brake shoes of these brake mechanisms are adapted to brake the reeling assemblies 33 and 35.

In the foregoing the power transmission assembly has been shown and described in the form of a pivotally mounted double-cone wheel assembly. It should be noted however that the invention should not be limited thereto.

Equivalent other mechanisms capable of performing the above-mentioned transmission functions may equally be adopted. For instance, somewhat modified idle wheels of conventional form may be utilized for the same purpose.

Instead of mechanical arrangements as described herein, electrical control means may be connected between the buttons F and W which means comprise for instance two flip-flops. The arrangement may be such that when one of the both buttons F and W is depressed either flip-flop is made conductive. On the other hand, when the both buttons are actuated simultaneously, the both flip-flops are energized. Such flip-flops are used in conjunction with a switch inserted in the drive motor circuit and so designed that when the both flip-flops are energized the switch is cut-off. It will be clear that such electronically controlled push-button operated switching mechanism will serve equally for the desired power transmission service of the tape reeling mechanism.

Therefore it is to be understood that the invention is not limited to the particular arrangement shown but that it includes within its purview whatever changes fairly fall within either the terms or the spirit of the appended claims.

What is claimed is:

1. In a tape drive control button arrangement of a tape recorder wherein a fast forward winding button, a playing button, a stop button, a recording button and a fast reverse button are arranged in a row and mounted on a supporting panel of said recorder so as to be separately manipulatable between on and off positions which commence and discontinue the respective functions denoted therefor, the improvement comprising a slide member associated with each of said fast forward winding, playing, recording and fast reverse winding buttons, means for linking each said slide member to its associated button so that manipulation of said button will also shift said slide member correspondingly between function "on" and function "off" positions, a slot in each said slide member, a lock plate slidably mounted on said supporting panel and slidable between first and second locking positions, spring means for maintaining said lock plate normally in its first locking position with all of said buttons in off positions, said lock plate having four projections each disposed in one of the slots of said slide members, the two slots of the slide members linked to said playing and recording buttons being provided with cooperative notches adapted to receive the projections disposed in said slots when said lock plate is moved from its first to its second locking position and said projections when so received locking said slide members in function "off" positions not shiftable to "on" positions until said lock plate is returned to its first locking position to withdraw said projections from said notches, the two slots of the slide members linked to said fast forward and fast reverse winding buttons being provided with cammed notches arranged to cam against the projections disposed in said slots as one of said slide members is moved to a function "on" position and thereby slide said lock plate from its first to second locking position, said lock plate being slidable from its first to second locking position and vice versa only when the slide members linked to said playing and recording buttons are both in function "off" positions to align the cooperative notches of the slots thereof and thereby permit receipt and withdrawal of the projections disposed in said slots, whereby the playing and recording pair of buttons and the fast forward and fast reverse winding pair of buttons may be manipulated in succession or simultaneously insofar as the buttons of each pair are concerned, but successive manipulation of buttons from one and then from the other of said pairs can be accomplished only with an intervening change in the locking position of said lock plate.

2. The improvement as in claim 1 wherein said linking means comprises a stem in the form of a strip extending from said button to said slide member, said stem having a forked end and said slide member having cooperative notches receiving the fork of said end to form a mechanical link.

3. The improvement as in claim 2 which includes a pivotable stopper plate having a relativley narrow width and a length sufficient to span across the row of stems extending from said buttons, the tips of the forked ends of said stems in the off position of said buttons resting upon said stopper plate adjacent one leng edge thereof, spring means for biasing said stopper plate pivotally against said tips, said stems being arranged to move across the width of said stopper plate so that as a button is manipulated from "off" to "on" position the tip of the associated stem pivots said stopper plate against the spring bias thereof until the opposite long edge is cleared and pivotally returns behind said tip to lock the same in "on" position.

4. The improvement as in claim 3 which includes spring means for biasing said stems to their "off" positions so that upon manipulation of a button from "off" to "on" position, all other stems previously locked in "on" positions automatically return to "off" positions as soon as said opposite long edge gives clearance to the tips of said previously locked stems.

5. The improvement as in claim 4 wherein said stopper plate includes a tongue extending out from the opposite long edge thereof for co-action only with the stem of said stop button, said tongue increasing the width of said stopper plate sufficiently to preclude the tip of said stop button stem from clearing and becoming locked behind said opposite long edge, whereby manipulation of said stop button from "off" to "on" position will automatically return all stems previously locked in "on" positions to "off" positions and release of the stop button will also automatically return the same to "off" position.

6. The improvement as in claim 1 wherein said slide members of said fast forward and fast reverse winding buttons are connected to a power transmission assembly comprising a rotatable rod having a cone-shaped friction drive wheel at each end thereof, a tape supply reel positioned adjacent one of said cone-shaped drive wheels and a tape take-up reel positioned adjacent the other said wheel, means for rotating said rod, means for pivotally supporting said rod and allowing it to pivot at its central point about a pivot axis normal to its length, a U-shaped bracket attached to said rod with said rod passing through and freely rotatable in the upstanding arms of said bracket and with the base of said bracket suspended below said pivot axis, a strip-spring assembly connected to each of said fast forward and fast reverse winding slide members and disposed about the base of said bracket on opposite sides of said pivot axis, said strip-spring assembly comprising a rigid strip extending from the point of connection to said slide member over the top and beyond the width of said bracket in a direction parallel to said pivot axis and a spring strip member connected to the end of said rigid strip beyond said bracket and extending in the same direction under the bottom of said bracket back towards said point of connection, a portion of said rigid strip being in contact with the top of said bracket and the remainder spaced therefrom to provide a clearance, said spring strip member being in contact with bottom of said bracket and curving upwardly at its unconnected end towards said rigid strip, said rigid strip-spring strip member connection being further connected to a rigid support which is movable reciprocably in the said direction parallel to said pivot axis, whereby movement of either of said slide members from "off" to "on" position will force said curved portion of said strip spring member under the bottom of said bracket to cam said bracket up into said clearance and thereby pivot said bracket along with said rotatable rod about said pivot axis to engage said cone-shaped friction wheel at the upwardly-pivoted end of said rod with one of said reels.

7. The improvement as in claim 6 wherein both said strip-spring strip assemblies have the same configuration including the clearances thereof above said bracket so that when both said slide members are in "off" positions said rotatable rod is maintained in a neutral position with no engagement between either of said cone-shaped friction wheels with either of said reels.

References Cited by the Examiner

UNITED STATES PATENTS

| | | | |
|---|---|---|---|
| 2,859,636 | 11/1958 | Hironimus | 74—483 |
| 2,951,914 | 9/1960 | Dubois | 242—55.13 X |
| 2,973,664 | 3/1961 | Williams. | |
| 3,142,198 | 7/1964 | Williams | 74—483 |

FRANK J. COHEN, *Primary Examiner*.

G. F. MAUTZ, *Examiner*.